Mar. 13, 1923.
L. SCHMITT.
MOTOR TENSION INDICATOR FOR TALKING MACHINES.
FILED NOV. 10, 1921.
1,448,366.
3 SHEETS—SHEET 1.
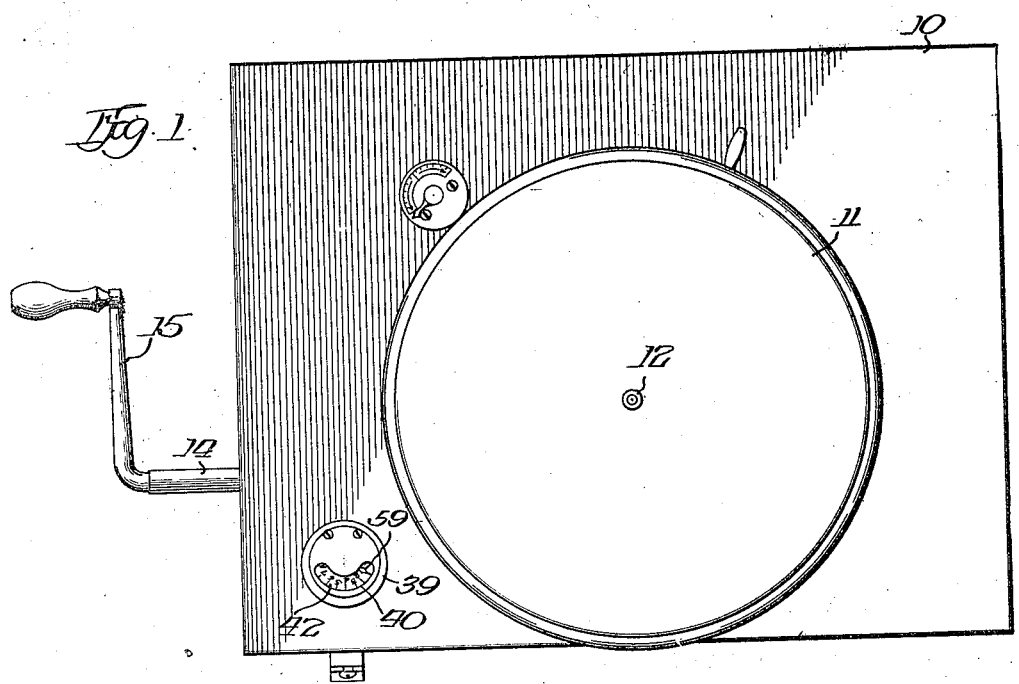
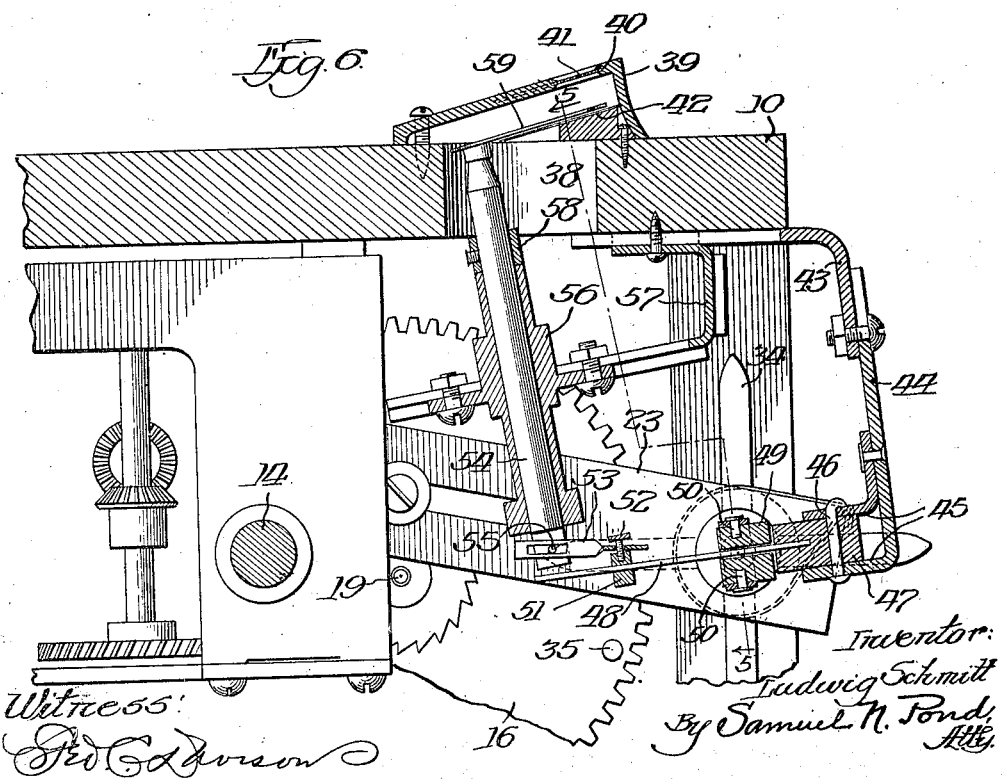

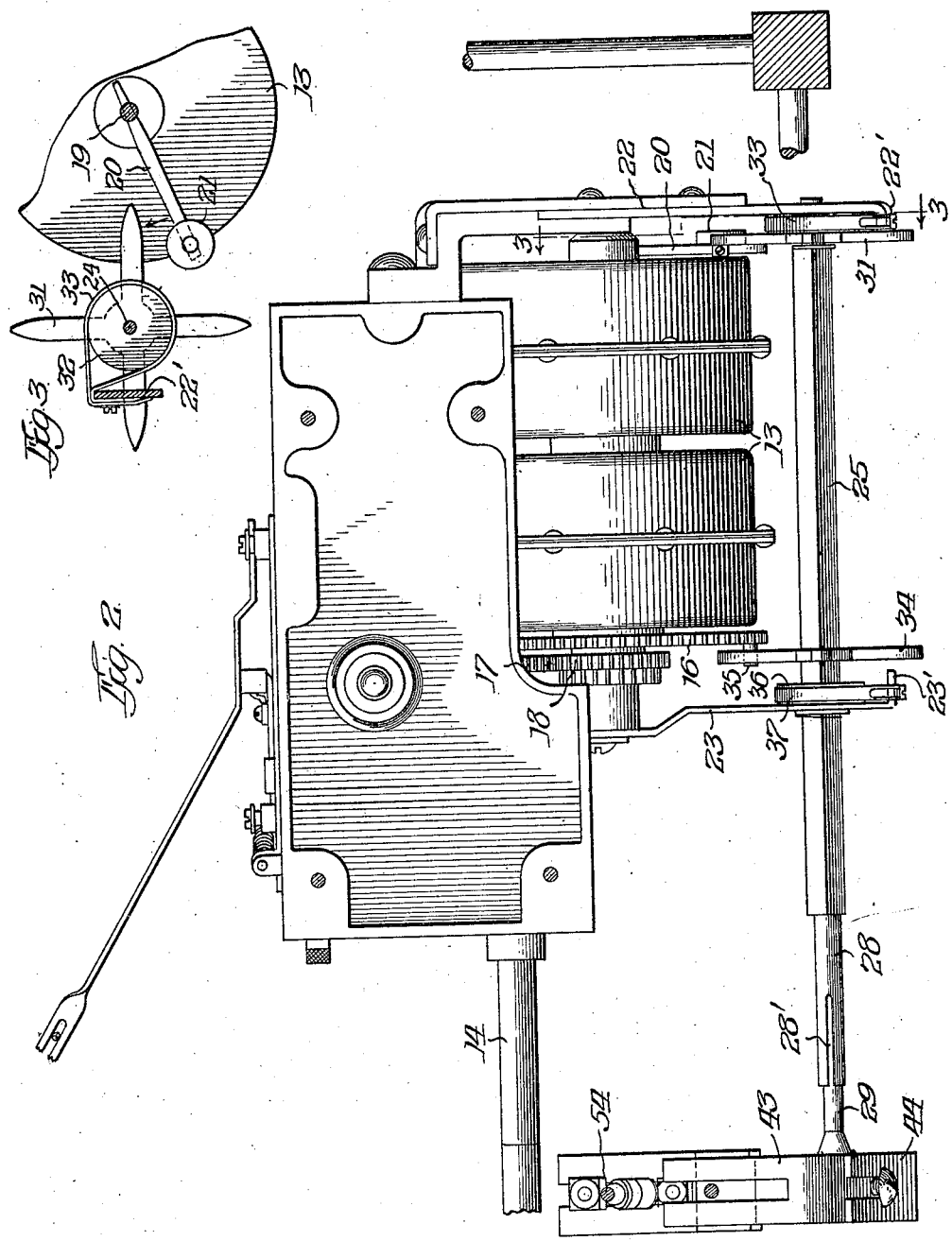

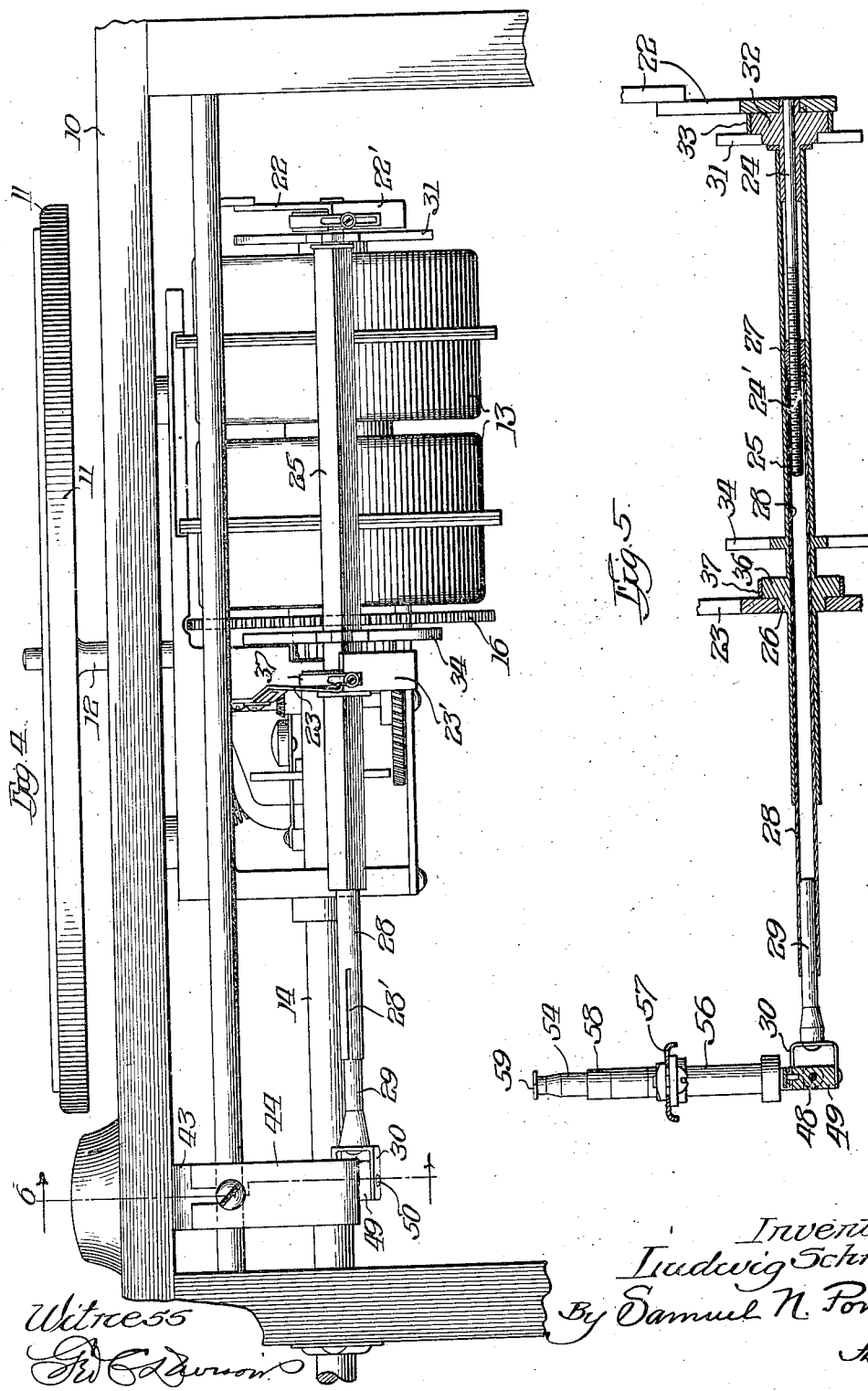

Patented Mar. 13, 1923.

1,448,366

UNITED STATES PATENT OFFICE.

LUDWIG SCHMITT, OF CHICAGO, ILLINOIS.

MOTOR-TENSION INDICATOR FOR TALKING MACHINES.

Application filed November 10, 1921. Serial No. 514,365.

*To all whom it may concern:*

Be it known that I, LUDWIG SCHMITT, a citizen of Germany (who has made application for naturalization as a citizen of the United States), residing at Chicago, in the county of Cook and State of Illinois, have invented certain new and useful Improvements in Motor-Tension Indicators for Talking Machines, of which the following is a specification.

This invention relates to indicators for use on phonographs and talking machines, and has reference more particularly to an improved visual indicator for disclosing the condition of tension at any time existing in the spring motor of the machine, whereby to enable the user to determine at a glance the extent to which the motor is run down and when the same requires to be rewound.

My invention, its mode or principle of operation, and the advantages inherent therein will be readily understood by persons skilled in the art from the following detailed description, taken in connection with the accompanying drawings, in which I have illustrated a practical embodiment of the invention as applied to a horizontal multiple spring motor, and in which—

Fig. 1 is a top plan view of a phonograph cabinet, with the lid removed, and showing the pointer and dial mounted thereon;

Fig. 2 is an enlarged sectional plan, taken in a horizontal plane just below the table or platform of the cabinet;

Fig. 3 is a sectional detail on the line 3—3 of Fig. 2;

Fig. 4 is an enlarged side elevation viewed from the lower side of Figs. 1 and 2;

Fig. 5 is a sectional elevation taken on the line 5—5 of Fig. 6, showing mainly the extensible rod which actuates the shaft of the dial pointer; and Fig. 6 is an enlarged cross-section taken on the line 6—6 of Fig. 4.

Referring to the drawings, 10 designates the usual table or platform of the cabinet, above which is mounted the rotary turn table 11 which supports the record discs. 12 is the shaft of the turn table, having the usual geared connections to a horizontally disposed multiple-spring motor 13 mounted on the under side of the platform 10. 14 designates the winding shaft which projects at one end through one side of the cabinet and is equipped with the usual handle 15. 16 designates the large spur gear at one end of the motor, to the hub of which gear is anchored the inner end of the last coil spring of the group; the gear 16 transmitting rotary motion to the turn table 11 through a train of reducing gears not fully herein shown, as the same is well known in the art. The inner end of the winding shaft 14 carries a pinion 17 (Fig. 2) which drives a gear 18 fast on a shaft 19 (Fig. 3) that extends entirely through the motor 13.

On the inner or rear end of the shaft 19, just outside the outer or rear spring drum is a radial arm 20 carrying at its free end a roller 21. As the winding shaft 14 and motor shaft 19 are turned to wind up the motor, the arm 20 revolves, of course in the opposite direction to the direction of rotation of the crank 15, the direction of movement of the arm 20 being indicated in Fig. 3 by an arrow.

22 and 23 designate a pair of longitudinally adjustable bracket arms attached to the motor supporting frame and lying opposite the two ends of the motor, respectively. Journaled in the free end of the arm 22 is a shaft 24 (Fig. 5) the inner portion of which is threaded as shown at 24'. Rotatably supported in the bracket arm 23 is a square tube 25, best shown in Figs. 2 and 4, carrying thereon a round axle 26 (Fig. 5) by which it is journaled in the bracket arm 23. The square tubular member 25 telescopes over the greater portion of the shaft 24, and within and slidably fitting the square tubular member 25 is a square nut 27 that is engaged with the threaded portion 24' of the shaft 24. The nut 27, in turn, is secured to the inner end of a round tubular member 28 that is slidably mounted within the square tubular member 25 and projects beyond one end of the latter, such projecting portion being longitudinally split, as shown at 28' (Fig. 4) to provide a friction grip for the stem 29 of a fork 30.

Fast on the shaft 24 just inside the bracket arm 22 is a star-wheel 31 fast with which is a hub or disc 32 around which is passed a friction brake-band 33 (Fig. 3), the ends of which are anchored to an inwardly bent end 22' of the bracket arm 22. The purposes of this brake mechanism are to prevent overthrow or back movement of the star-wheel 31 when the same is advanced by the roller 21, and to hold the shaft 24 against turning when the nut 27 is turned.

Fast on the square tubular member 25 is a second star wheel 34, which is driven in the same direction as the star wheel 31 by means of a stud 35 (Figs. 2 and 6) projecting laterally from the motor driven gear wheel 16.

The square tubular member 25 is held against rotation except when turned by the stud 35 and star wheel 34, by means of a friction brake comprising a disc 36 fast with the square tubular member 25 and a brake band 37 passed around said discs and anchored at its ends to an inwardly bent end 23' of the bracket arm 23.

From the foregoing it will be evident that as the motor is wound up by the crank 15, the star-wheel 31 is intermittently turned by the arm 20 and roller 21, thereby turning the threaded shaft 24 in the nut 27, and thereby causing an outward travel of the inner telescoping tube 28 and the stem 29 and fork 30 carried thereby. Conversely, when the motor is running down, the square tubular member 25 is rotated in the same direction by the stud 35 and star wheel 34, the threaded shaft 24 being held against rotation by its brake 33. This causes a turning of the nut 27 on the threaded shaft 24 and a consequent inward travel of the telescoping member 28, stem 29 and fork 30.

Referring mainly to Figs. 1 and 6, secured to the top of the platform 10 over an opening 38 is a casing 39 for an indicator dial, said casing having an arcuate slot 40 preferably closed by isin-glass 41 and overlying an arcuate scale 42 (Fig. 1). Secured to the underside of the platform 10 is a slotted horizontally adjustable bracket member 43 having a downwardly turned end to which is adjustably attached a slotted extension member 44 provided with a forked inwardly extending end 45. In the fork 45 is pivoted on a pin 46 a block 47, in which latter is mounted an inwardly extending rod or arm 48. Slidably mounted on the arm 48 is a block 49 that is articulated to the fork 30 by pivot pins 50. Also slidably mounted on the arm 48, inwardly of the block 49 is a smaller block 51 to which is articulated by a thumb screw 52, a longitudinally slotted arm 53 which lies within the slotted lower end of an upright pointer shaft 54, being jointed to the latter by a cross-pin 55. The shaft 54 is journaled in a long bearing 56, which latter is adjustably supported in a depending slotted hanger bracket 57 secured to the underside of the platform 10. On the pointer shaft 54 is keyed a collar 58 that bears against the upper end of the shaft bearing 56 and thus holds the pointer shaft against downward movement. Fast on the upper end of the pointer shaft 54 is the pointer 59 which cooperates with the scale 42.

The operation of the indicating mechanism has been indicated to a considerable extent in the description of its structure and organization. As the crank 15 is turned to wind up the motor, the threaded shaft 24 is intermittently turned by the arm 20 and roller 21 acting on the star wheel 31, thereby through the nut 27, tube 28, stem 29, fork 30 and block 49, swinging the arm 48 outwardly relatively to the frame of the cabinet, and, through the pivotal connection of arm 48 to arm 53, turning the pointer shaft 54 in a direction to cause the pointer 59 to travel upwardly or forwardly on the scale 42. When the motor is running, the square tube 25 is intermittently rotated in the same direction from the gear-wheel 16 through the stud 35 and star-wheel 34, thereby producing a movement of the tube 28 and the connections therefrom to the pointer shaft and pointer in the reverse direction, so that the pointer then travels rearwardly or backwardly on the scale. If the motor is wound at a speed which just balances its unwinding movement, the shaft 24 and the nut 27 will both turn in the same direction and at the same speed so that there will be no relative turning movement between them and consequently the pointer will remain stationary.

The device as herein shown and described is readily adjustable for application to cabinets of varying sizes. For instance, supporting bracket arms 22 and 23 are longitudinally adjustable by the common expedient of slots and clamp screws so that the star wheels and their supporting shafts can be set nearer to or farther from the motor, and the same is true of the bracket 43 which supports the lever connections to the pointer shaft. The supporting shafts of the star wheels can also be raised and lowered by loosening the clamping screws of the arms 22 and 23 and adjusting the latter up and down and also adjusting the bracket section 44 correspondingly relatively to the bracket section 43. Again, the substantially horizontal adjustability of the pointer shaft bearing 56 on its longitudinally slotted supporting bracket 57, together with the adjustability of the block 51 on the arm 48 and the slotted lever arm 53 relatively to the pointer shaft 54 enable the indicator dial to be located at different distances from the rear edge of the platform 10. The entire mechanism is, of course, located entirely within the walls of the usual cabinet, so that it is entirely concealed from view.

Manifestly, the mechanism herein shown and described in detail can be variously modified without departing from the principle of the invention or sacrificing any of the advantages thereof. Hence, I reserve all such variations and modifications as fall within the spirit and purview of the appended claims.

I claim:

1. In a tension indicator for spring motors, the combination of a scale, a pointer cooperating with said scale, a pointer shaft, an arm on said pointer shaft, an endwise movable rod for swinging said arm, a nut carried by said rod, a threaded shaft engaged with said nut, means actuated by a winding element of the motor for turning said threaded shaft, means actuated by a motor driven element for turning said nut, and brakes for holding each of said threaded shaft and nut against turning under the frictional drag of the other.

2. In a tension indicator for spring motors, the combination of a scale, a pointer cooperating with said scale, a pointer shaft, an arm on said pointer shaft, an endwise movable rod for swinging said arm, a nut carried by said rod, a threaded shaft engaged with said nut, a star-wheel fast on said threaded shaft, a square tubular housing enclosing said rod, threaded shaft and nut, and fitting the latter, a star wheel fast on said tubular housing, means actuated by a winding element of the motor for intermittently turning said first-named star-wheel, means actuated by a motor driven element for intermittently turning said second-named star wheel, and friction brakes on said threaded shaft and tubular member for holding each against turning under the frictional drag of the other.

3. In a tension indicator for the spring motor of a talking machine, the combination with a motor supporting platform, and a spring motor secured to the underside thereof, of a scale mounted on said platform, a pointer shaft extending through and beneath said platform, a pointer on the upper end of said pointer shaft cooperating with said scale, an arm on the lower end of said pointer shaft, adjustable brackets secured to the under side of said platform, an endwise movable rod supported by said brackets, lengthwise adjustable means for pivotally connecting said rod to said arm, means actuated by a winding element of the motor for shifting said rod in one direction, and means actuated by a motor driven element for shifting said rod in the opposite direction.

4. In a tension indicator for the spring motor of a talking machine, the combination with a motor supporting platform, and a horizontally disposed spring motor mounted on the under side thereof, of a scale mounted on said platform, a pointer shaft extending through and beneath said platform, a pointer on the upper end of said pointer shaft cooperating with said scale, an arm on the lower end of said pointer shaft, horizontally and vertically adjustable brackets secured to the under side of said platform, an extensible endwise movable rod supported by said brackets parallel with the axis of said motor, lengthwise adjustable means for pivotally connecting said rod at one end to said arm, means actuated by a winding element of the motor for shifting said rod in one direction, and means actuated by a motor driven element for shifting said rod in the opposite direction.

5. In a tension indicator for the spring motor of a talking machine, the combination with a motor supporting platform, and a horizontally disposed spring motor mounted on the under side thereof, of a scale mounted on said platform, a pointer shaft extending through and beneath said platform, a pointer on the upper end of said pointer shaft cooperating with said scale, an arm on the lower end of said pointer shaft, horizontally adjustable brackets secured to the under side of said platform, a lever pivotally mounted on the lower end of one of said brackets, a pivotal connection between said lever and said arm, an endwise movable rod supported by said brackets and pivoted at one end to said lever, means actuated by a winding element of the motor for shifting said rod in one direction, and means actuated by a motor driven element for shifting said rod in the opposite direction.

6. In a tension indicator for the spring motor of a talking machine, the combination with a motor supporting platform, and a horizontally disposed spring motor mounted on the under side thereof, of a scale mounted on said platform, a pointer shaft extending through and beneath said platform, a pointer on the upper end of said pointer shaft cooperating with said scale, an arm on the lower end of said pointer shaft, horizontally and vertically adjustable brackets secured to the under side of said platform, a lever pivotally mounted on the lower end of one of said brackets, a pivotal connection between said lever and said arm, adjustable lengthwise thereof, an endwise movable rod supported by said brackets and pivoted at one end to said lever, between the pivot of the latter and its connection to said arm, means actuated by a winding element of the motor for shifting said rod in one direction, and means actuated by a motor driven element for shifting said rod in the opposite direction.

LUDWIG SCHMITT.